(12) United States Patent
Hart et al.

(10) Patent No.: US 11,067,060 B2
(45) Date of Patent: Jul. 20, 2021

(54) SYSTEM AND METHOD FOR CONTROLLING A HYBRID ENERGY FACILITY HAVING MULTIPLE POWER SOURCES

(71) Applicant: General Electric Company, Schenectady, NY (US)

(72) Inventors: Patrick Hammel Hart, Ballston Lake, NY (US); Alina Fatima Moosvi, Ballston Spa, NY (US); Charles Joseph Kosuth, Albany, NY (US); Gissel Idaly Gardea-Torres, Greenville, SC (US); Enno Ubben, Salzbergen (DE)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 16/287,065

(22) Filed: Feb. 27, 2019

(65) Prior Publication Data

US 2020/0271098 A1 Aug. 27, 2020

(51) Int. Cl.
*G05B 15/02* (2006.01)
*F03D 9/25* (2016.01)
*H02J 3/16* (2006.01)
*H02J 3/38* (2006.01)

(52) U.S. Cl.
CPC ............... *F03D 9/257* (2017.02); *H02J 3/16* (2013.01); *H02J 3/386* (2013.01); *G05B 15/02* (2013.01)

(58) Field of Classification Search
None
See application file for complete search history.

(56) References Cited

U.S. PATENT DOCUMENTS

| 8,290,634 | B2 | 10/2012 | Larsen et al. |
| 9,407,186 | B2 | 8/2016 | Babazadeh et al. |
| 9,496,812 | B2 | 11/2016 | Kragelund et al. |
| 9,556,852 | B2 | 1/2017 | Babazadeh et al. |

(Continued)

FOREIGN PATENT DOCUMENTS

| DE | 102014000790 A1 * | 7/2015 | ............. F03D 7/028 |
| DE | 102016007098 A1 | 12/2017 | |
| WO | WO2018093593 A1 | 5/2018 | |

OTHER PUBLICATIONS

Machine Translation of DE-102014000790-A1 (Jul. 2015).*

(Continued)

*Primary Examiner* — Ryan A Jarrett
(74) *Attorney, Agent, or Firm* — Dority & Manning, P.A.

(57) ABSTRACT

A method for automatically controlling a renewable energy facility having a plurality of power sources includes operating, via a farm-level controller, the hybrid renewable energy facility at a first farm-level power set point. The method also includes modifying, via the farm-level controller, the first power set point to a second farm-level power set point. In response to modifying the first power set point to the second farm-level power set point, the method includes generating one or more power change requests for individual controllers of the plurality of power sources. Further, the method includes generating a power output via the plurality of power sources so as to transfer power generation from one of the plurality of power sources to another while minimizing the impact on farm-level production.

12 Claims, 9 Drawing Sheets

(56) References Cited

U.S. PATENT DOCUMENTS

| | | |
|---|---|---|
| 9,660,448 B2 | 5/2017 | Ellena et al. |
| 9,709,035 B2 | 7/2017 | Sagi et al. |
| 9,822,766 B2 | 11/2017 | Cardinal et al. |
| 9,915,243 B2 | 3/2018 | Sagi et al. |
| 10,012,214 B2 | 7/2018 | Kjaer et al. |
| 10,097,009 B2 | 10/2018 | Hart et al. |
| 2010/0145533 A1 | 6/2010 | Cardinal et al. |
| 2015/0001939 A1 | 1/2015 | Kojima et al. |
| 2017/0067445 A1 | 3/2017 | Carulla |

OTHER PUBLICATIONS

European Search Report, dated Apr. 17, 2020 for EP Application No. 20159259.9.

Knudsen et al., Distributed Control of Large-Scale Offshore Wind Farms, European Wind Energy Conference and Exhibition, EWEC, 2009, 8 pages.

Raducu et al., Design and Implementation of a Hybrid Plant Controller, 3rd International Hybrid Power Systems Workshop, May 8-9, 2018, 12 Pages.

* cited by examiner

SYSTEM AND METHOD FOR CONTROLLING A HYBRID ENERGY FACILITY HAVING MULTIPLE POWER SOURCES

FIELD

The present subject matter relates generally to hybrid renewable energy facilities and, more particularly, to systems and methods for automatically controlling a hybrid renewable energy facility having a plurality of power sources with different response rates.

BACKGROUND

Wind power is considered one of the cleanest, most environmentally friendly power sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a main shaft coupling the rotor blades to a gearbox, or if a gearbox is not used, directly to the generator. The generator then converts the mechanical energy to electrical energy that may be deployed to a utility grid.

In some instances, additional power sources may also be employed in a wind farm. For example, energy storage devices (ESDs) may be used in wind and solar farms to fulfill a specific use case. Example ESDs could be batteries, supercapacitors, pumped storage, compressed gas storage, flywheels, and/or any other device in which, or means by which energy can be stored for later use. A typical use case for ESDs in a wind farm is to store the energy produced by the wind turbines when the wind farm is curtailed by the grid operator and to release and sell the energy when the curtailment is lifted. ESDs can also be used to supply the energy consumed by the auxiliary loads and losses inside the wind farm. Auxiliary loads represent the energy consumed by the devices inside the wind turbines such as yaw motors, various pumps or fans, and/or heaters.

With the increase in multiple-asset power production facilities being built, it is beneficial to improve the performance of such facilities and to extract more value from each of the assets. In general, it is desirable to produce power using the most economical power source(s) of the renewable energy facility, while achieving the desired performance required by the environment thereof.

Accordingly, the present disclosure is directed to improved systems and methods for automatically controlling a hybrid renewable energy facility having a plurality of power sources with different response rates.

BRIEF DESCRIPTION

Aspects and advantages of the invention will be set forth in part in the following description, or may be obvious from the description, or may be learned through practice of the invention.

In one aspect, the present disclosure is directed to a method for automatically controlling a renewable energy facility having a plurality of power sources. The method includes operating, via a farm-level controller, the hybrid renewable energy facility at a first farm-level power set point. The method also includes modifying, via the farm-level controller, the first power set point to a second farm-level power set point. In response to modifying the first power set point to the second farm-level power set point, the method includes generating one or more power change requests for individual controllers of the plurality of power sources. Further, the method includes generating a power output via the plurality of power sources so as to transfer power generation from one of the plurality of power sources to another to reach and maintain the second farm-level power set point.

In one embodiment, generating the power output via the plurality of power sources may include generating the power output via a first energy source of the plurality of energy sources, the first energy source having a first response rate, and after the power output reaches the second farm-level power set point, generating at least a portion of the power output via a second energy source of the plurality of energy sources, the second energy source having a second response rate that is less than the first response rate.

In such embodiments, as the second power source begins to generate at least the portion of the power output, the first power source reduces an equivalent amount of power generated thereby. In another embodiment, the method may include reducing the amount of power generated by the first power source to zero during a transition period after the power output reaches the second farm-level power set point.

In further embodiments, the method may include controlling the hybrid renewable energy facility via a closed loop architecture. More specifically, in certain embodiments, generating the power output via the first power source and then generating at least portion of the power output via the second power source after the power output reaches the second power set point may include determining, via the farm-level controller, first and second power set points for the first and second power sources of the plurality of power sources based on the second farm-level power set point and a power feedback signal from the plurality of power sources and operating the first and second power sources based on the first and second power set points.

In additional embodiments, the method may include determining the first and second power set points for the first and second power sources based on the second farm-level power set point, the power feedback signal from the plurality of power sources, and a plurality of additional inputs relating to each of the plurality of power sources. In such embodiments, the plurality of additional inputs relating to each of the plurality of power sources may include a desired power, an actual power, a maximum available power, a minimum available power, a priority of each of the plurality of power sources, and/or whether farm control is enabled or disabled.

In certain embodiments, the method may include prioritizing the power change requests to accommodate potential conflicts. In such embodiments, the farm-level controller may prioritize the power change requests by determining which power source will operate when there are conflicting power set points.

In particular embodiments, the method may include determining, via the farm-level controller, the power change requests for the plurality of power sources by receiving, from the individual controllers, individual power set points for the plurality of power sources, determining a delta between each the individual power set points and an actual power of each the plurality power sources, respectively, and determining the power change requests for the plurality of power sources as a function of the delta.

In several embodiments, determining the power change requests for the plurality power sources as a function of the delta may include, for example, determining whether the delta is positive or negative by applying a gain and/or a limiter to the delta.

In further embodiments, prioritizing the power change requests to accommodate potential conflicts may include identifying, via the farm-level controller, a capacity of one or more of the plurality of power sources to accept the power change requests and assigning each of the power change requests to an power source from the plurality of power sources in priority order from highest capacity to lowest capacity.

In another embodiment, the first and second power sources may include, for example, a solar panel, an energy storage device, or a wind turbine. As such, the renewable energy facility may include for example, a wind farm, a solar farm, or energy storage system.

In another aspect, the present disclosure is directed to a hybrid renewable energy facility connected to a power grid. The hybrid renewable energy facility includes a plurality of power source for generating power output at varying response rates each comprising an individual controller. The individual controllers each operate according to an individual power set point. The renewable energy facility also includes a farm-level controller communicatively coupled to each of the individual controllers. The farm-level controller is configured to send a farm-level power set point to each of the individual controllers. In response to receiving the farm-level power set point, the individual controllers collectively respond to obtain a power output that reaches the farm-level power set point. Further, when the individual controllers respond to obtain the power output that reaches the farm-level power set point and reach a power split that differs from the individual power set points, the farm-level controller is configured to perform operations, including but not limited to generating power change requests for the individual controllers so as to maintain the farm-level power set point, prioritizing the power change requests for each of the individual controllers, and generating a power output equal to the farm-level power set point via the plurality of power sources in priority order.

It should be understood that the renewable energy facility may further include any of the additional features and/or steps described herein.

In yet another aspect, the present disclosure is directed to a method for automatically controlling a renewable energy facility having a plurality of power sources with different power response rates. The method includes providing a farm-level power set point. The method also includes generating, via a farm-level controller, power change requests for the plurality of power sources so as to maintain the farm-level power set point. Further, the method includes prioritizing the power change requests for each of the plurality of power sources. Moreover, the method includes generating a power output equal to the farm-level power set point via the plurality of power sources in priority order from highest capacity to lowest capacity. It should be understood that the method may further include any of the additional steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
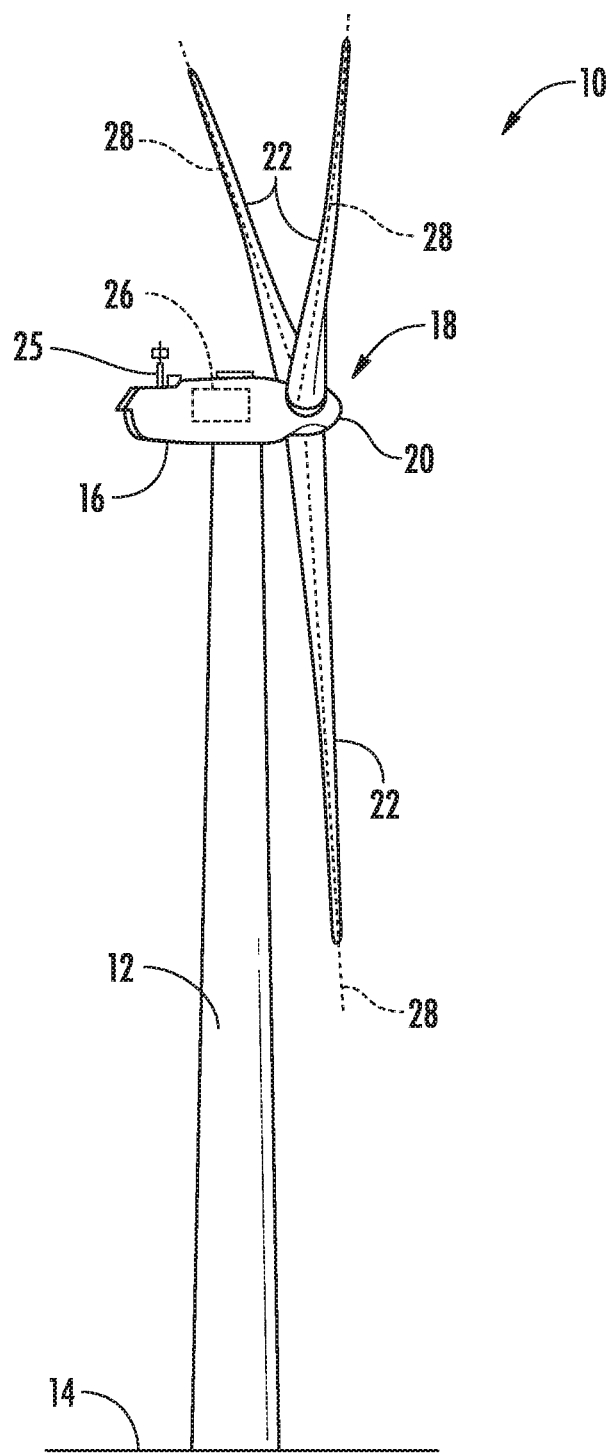
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for automatically distributing set point commands among assets (i.e. power sources) that have different response rates. More specifically, the present disclosure is directed to a supervisory set of logic that determines the ideal power split between the power sources required to achieve the farm-level set point. As such, the present disclosure includes a modification to the control of each group of power sources that changes the behavior of the group to align with the desired power split without significantly impacting the combined output of the hybrid renewable energy facility. The task is performed by identifying the frequency components of commands or required reactions to system disturbances and distributing the commands to the assets accordingly. The proposed control structure performs this task with minimal tuning requirements during commissioning, and no online inputs from a user during typical operation. As such, the present disclosure results in greater flexibility of individual asset control while maintaining a farm-level set point.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
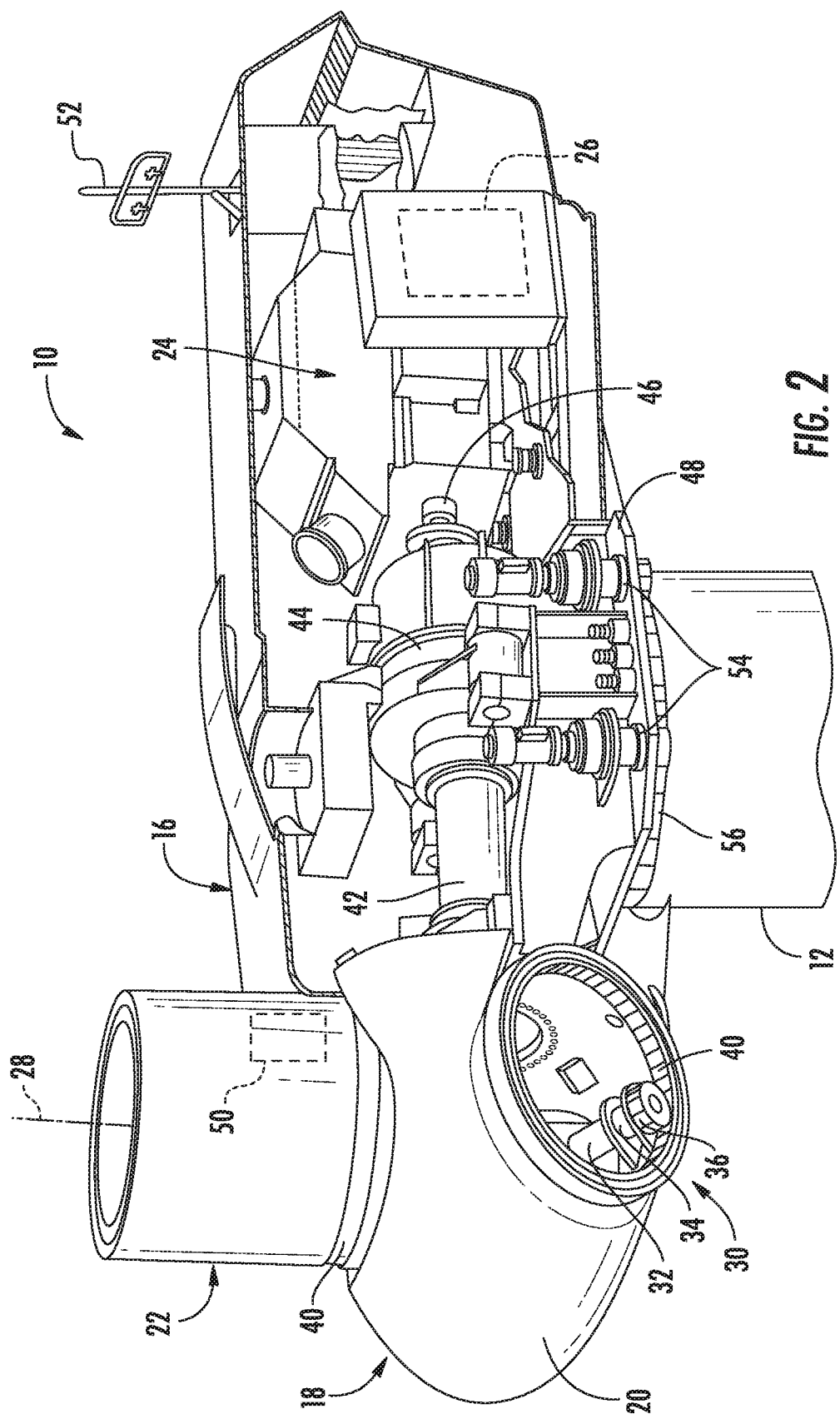
FIG. 2 illustrates a perspective, internal view of one embodiment of a nacelle of a wind turbine according to the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 46 coupled to the hub 20 for rotation therewith. The generator 24 may then be coupled to the main shaft 46 such that rotation of the main shaft 46 drives the generator 24. For instance, in the illustrated embodiment, the generator 24 includes a generator shaft 46 rotatably coupled to the main shaft 46 through a gearbox 44. However, in other embodiments, it should be appreciated that the generator shaft 46 may be rotatably coupled directly to the main shaft 46. Alternatively, the generator 24 may be directly rotatably coupled to the main shaft 46. In addition, as shown, it should be appreciated that the main shaft 46 may generally be supported within the nacelle 16 by a support frame or bedplate 48 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 30 configured to rotate each rotor blade 22 about its pitch axis 28. Further, each pitch adjustment mechanism 30 may include a pitch drive motor 32 (e.g., any suitable electric, hydraulic, or pneumatic motor), a pitch drive gearbox 34, and a pitch drive pinion 36. In such embodiments, the pitch drive motor 32 may be coupled to the pitch drive gearbox 34 so that the pitch drive motor 32 imparts mechanical force to the pitch drive gearbox 34. Similarly, the pitch drive gearbox 34 may be coupled to the pitch drive pinion 36 for rotation therewith. The pitch drive pinion 36 may, in turn, be in rotational engagement with a pitch bearing 40 coupled between the hub 20 and a corresponding rotor blade 22 such that rotation of the pitch drive pinion 36 causes rotation of the pitch bearing 40. Thus, in such embodiments, rotation of the pitch drive motor 32 drives the pitch drive gearbox 34 and the pitch drive pinion 36, thereby rotating the pitch bearing 40 and the rotor blade 22 about the pitch axis 28. Similarly, the wind turbine 10 may include one or more yaw drive mechanisms 54 communicatively coupled to the controller 26, with each yaw drive mechanism(s) 54 being configured to change the angle of the nacelle 16 relative to the wind (e.g., by engaging a yaw bearing 56 of the wind turbine 10).

In addition, as shown in FIG. 2, one or more sensors 50, 52 may be provided on the wind turbine 10. More specifically, as shown, a blade sensor 50 may be configured with one or more of the rotor blades 22 to monitor the rotor blades 22. Further, as shown, a wind sensor 52 may be provided on the wind turbine 10 for measuring various wind conditions. For example, the wind sensor 50 may a wind vane, and anemometer, a LIDAR sensor, or another suitable wind sensor. As such, the sensors 50, 52 may further be in communication with the controller 26, and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
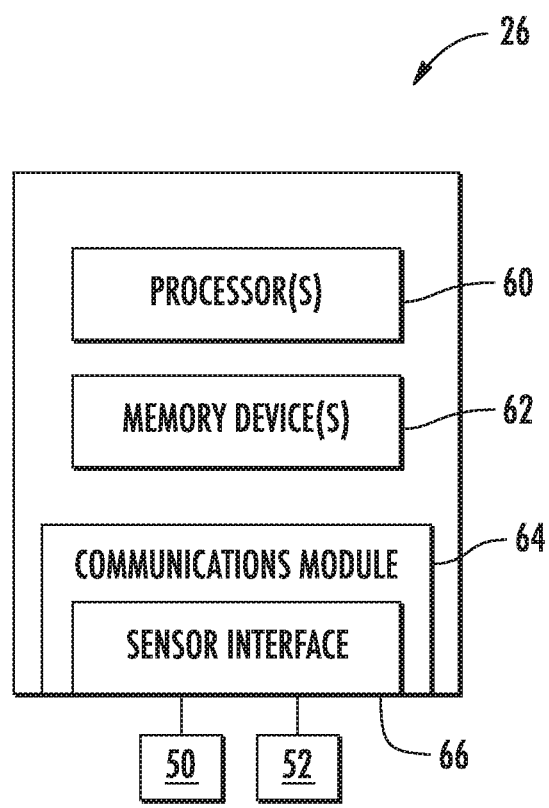
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controllers 26 according to the present disclosure. As shown, the controllers 26 of the present disclosure may include one or more processor(s) 60 and associated memory device(s) 62 configured to perform a variety of computer-implemented functions (e.g., performing the methods, steps, calculations and the like and storing relevant data as disclosed herein). Additionally, the controllers 26 may also include a communications module 64 to facilitate communications between the controllers 26 and the various components of the wind turbine 10. Further, the communications module 64 may include a sensor interface 66 (e.g., one or more analog-to-digital converters) to permit signals transmitted from one or more sensors 50, 52 to be converted into signals that can be understood and processed by the processors 60. It should be appreciated that the sensors 50, 52 may be communicatively coupled to the communications module 64 using any suitable means. For example, as shown in FIG. 3, the sensors 50, 52 are coupled to the sensor interface 66 via a wired connection. However, in other embodiments, the sensors 50, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 4:
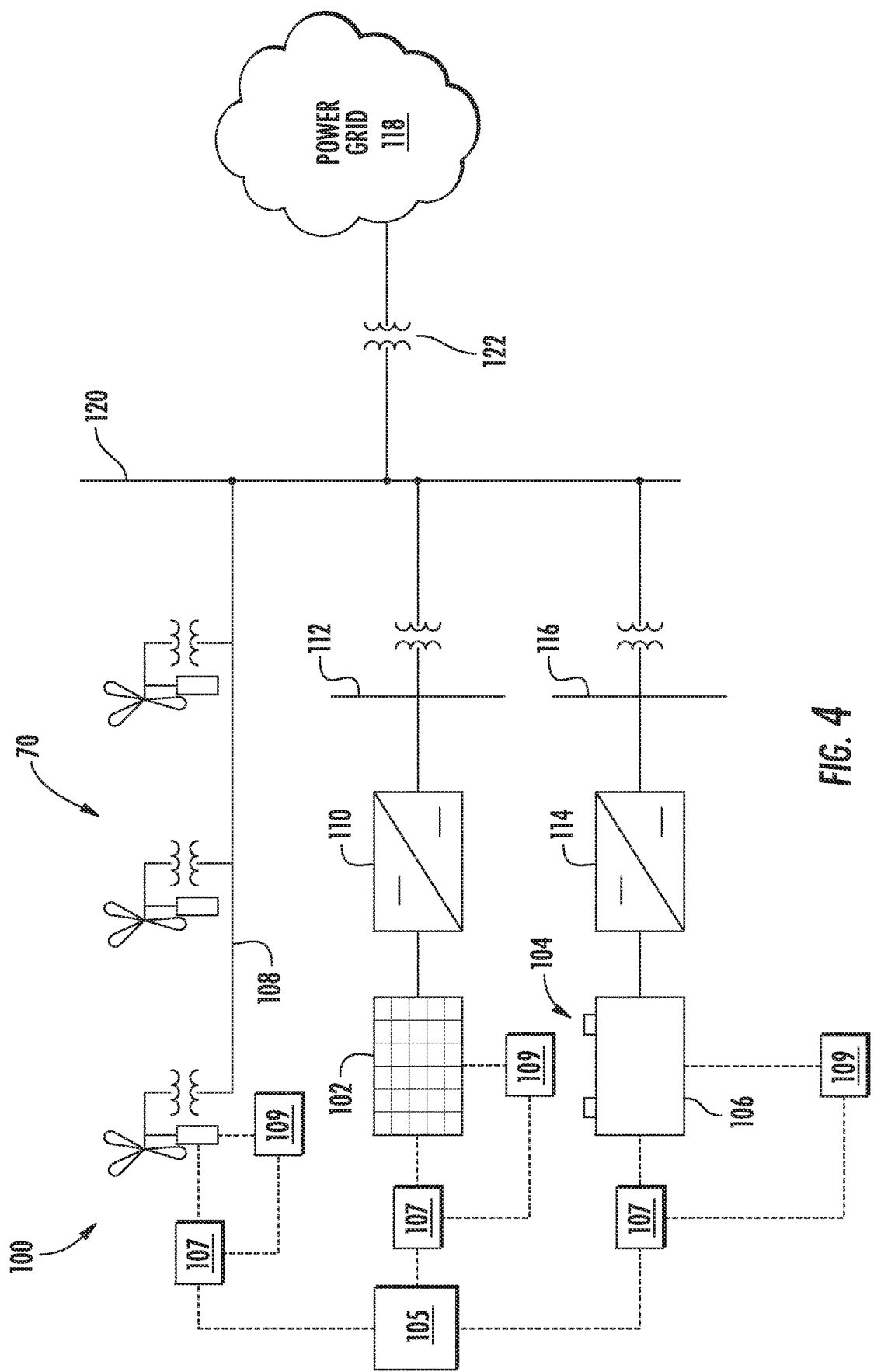
FIG. 4 illustrates a schematic diagram of one embodiment of a hybrid renewably energy facility according to the present disclosure.

Referring now to the drawings, FIG. 4 illustrates a schematic diagram of one embodiment of a hybrid renewable energy facility 100 according to the present disclosure. As shown, the illustrated renewable energy facility 100 depicts multiple sources of power (also referred to herein as assets) including, for example, a wind farm 70 having a plurality of wind turbines, such as the wind turbine 10 in FIG. 1, one or more solar panels 102, and/or a battery power source 104, all of which may be controlled by a farm-level controller 105. In addition, as shown, each of the power sources may have a group controller 107 that follows a similar feedback and common set point, observing the same error, as the farm-controller 105. Furthermore, each individual power source may also include an individual controller 109.

The battery power source 104 described herein may be an electrical power source. For example, in certain embodiments, the battery power source 104 may include one or more energy storage devices (ESDs) 106, including but not limited to batteries (e.g. a lithium ion battery, a sodium nickel chloride battery, a sodium sulfur battery, a nickel metal hydride battery, a nickel cadmium battery, etc.), fuel cells, supercapacitors, pumped storage, compressed gas storage, flywheels, and/or any other suitable device in which, or means by which energy can be stored for later use. For example, in one embodiment, the battery power source 104 may include one or more sodium nickel chloride batteries.

Still referring to FIG. 4, the wind farm 70 may be incorporated into the renewably energy facility 100 via bus 108. Moreover, as shown, the solar panel(s) 102 may be incorporated into the energy facility 100 via a solar inverter 110 that is connected to a low voltage DC bus 112. Further, as shown, the energy storage device(s) 106 may also be connected into the energy facility 100 via an energy storage inverter 114 that is connected to a separate low voltage DC bus 116. The various components of the renewable energy facility 100 can then be connected to the power grid 118 via bus 120. More specifically, as shown, the renewable energy facility 100 may be connected to the power grid 118 via a main transformer 122.

Figure 5:
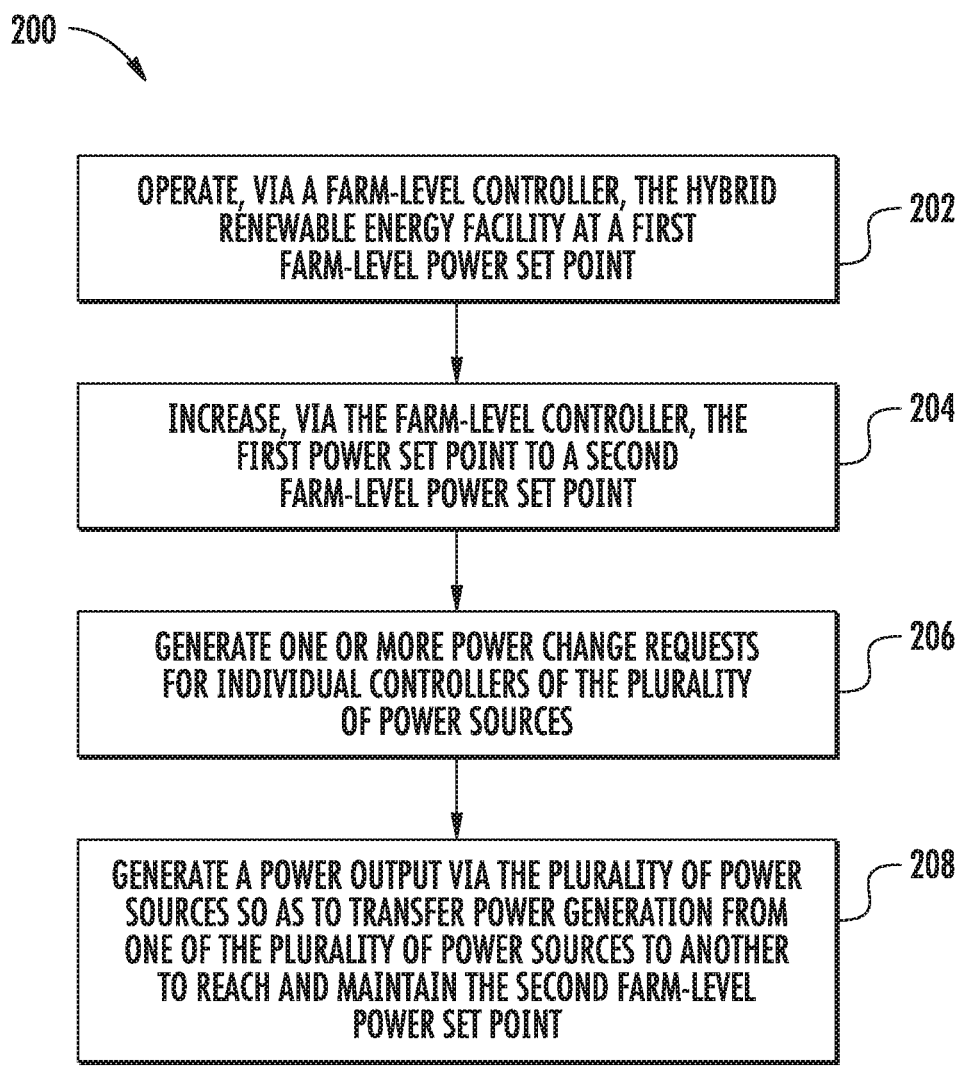
FIG. 5 illustrates a flow diagram of one embodiment of a method for automatically controlling a renewable energy facility having a plurality of power sources according to the present disclosure.

Referring now to FIG. 5, a flow diagram of one embodiment of a method 200 for automatically controlling a renewable energy facility sources (such as a wind farm or a solar farm) having a plurality of power sources connected to a power grid in is illustrated. In general, the method 200 will be described herein with reference to the wind farm 70 shown in FIG. 5. However, it should be appreciated that the disclosed method 200 may be implemented with any renewable energy facility having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 202, the method 200 includes operating, via a farm-level controller 105, the hybrid renewable energy facility 100 at a first farm-level power set point. As shown at 204, the method 200 includes modifying, via the farm-level controller 105, the first power set point to a second farm-level power set point. In response to modifying the first power set point to the second farm-level power set point, as shown at 206, the method 200 includes generating one or more power change requests for individual controllers of the plurality of power sources. As shown at 208, the method 200 includes generating a power output via the plurality of power sources so as to transfer power generation from one of the plurality of power sources to another to reach and maintain the second farm-level power set point.

For example, in one embodiment, the farm-level controller 105 may generate the power output via the plurality of power sources by generating a power output via a first power source (e.g. via the one or more solar panels 102). The first power source has a first response rate. After the power output reaches the second farm-level power set point, the method 200 includes generating at least a portion of the power output via a second power source (e.g. via the wind farm 70) of the plurality of power sources. In such embodiments, the second power source has a second response rate that is less than the first response rate. Accordingly, the present disclosure provides the ability to respond to the second farm-level power set point with a particular asset that may be expensive to operate but provides the response capability needed to achieve the performance required by the grid utilities. After the first response, the steady state response is transferred to another asset that is less expensive to operate or provides other secondary benefits.

In one embodiment, as the second power source begins to generate at least the portion of the power output, the first power source reduces an equivalent amount of power generated thereby. More specifically, in such embodiments, the method 200 may include reducing the amount of power generated by the first power source to zero during a transition period after the power output reaches the second farm-level power set point. Thus, in one example, each asset type (i.e. the solar panels 102 and the wind farm 70) of the renewable energy facility 100 may be designed to produce 10 megawatts (MW) of power for a total of 20 MW. If the renewable energy facility 100 is curtailed to 5 MW and the curtailment is subsequently lifted to 10 MW, the facility may respond immediately by filling the available power using the solar panels 102, which have a faster response. With Production Tax Credits (PTC), however, the value of wind power is higher. Therefore, after the facility 100 has increased the total power from 5 MW to 10 MW, the controller 105 can generate commands to trade solar power for wind power, yielding higher returns for the hybrid facility 100.

Figure 6:
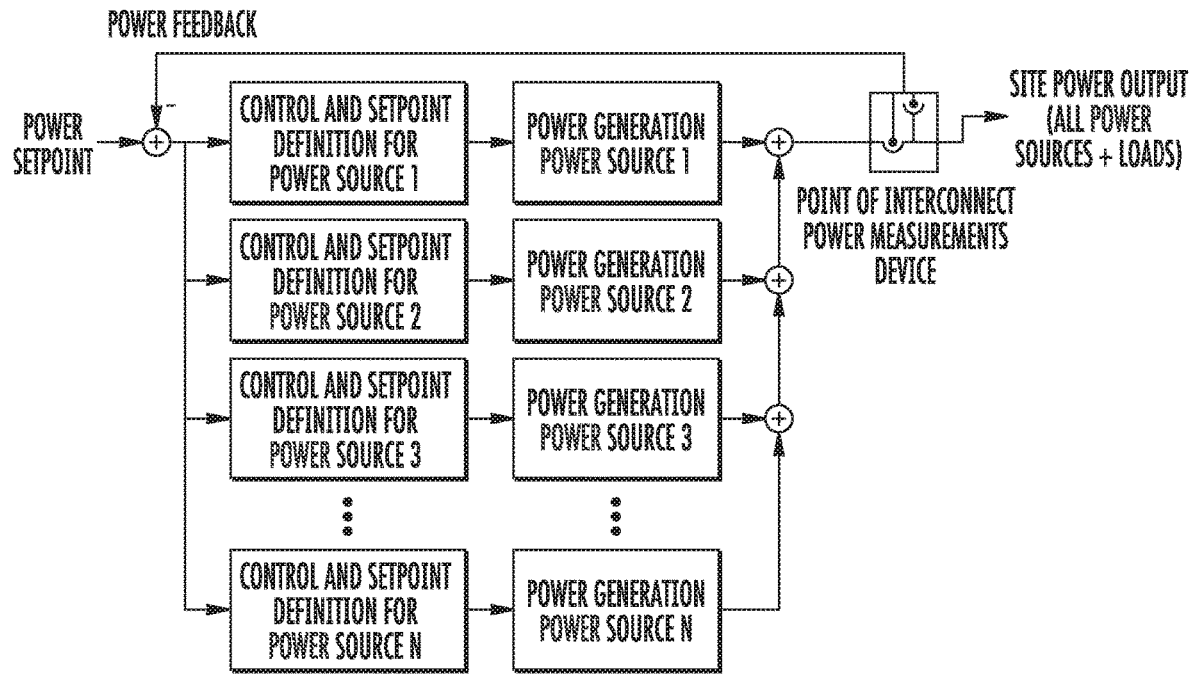
FIG. 6 illustrates a schematic diagram of one embodiment of a control architecture for automatically controlling a renewable energy facility having a plurality of power sources according to the present disclosure.

Referring now to FIG. 6, the method 200 may include controlling the hybrid renewable energy facility 100 via a closed loop architecture. This control architecture is generally used to maintain the power production of the facility 100 and to shape the response to any required grid services provided by the power generation. More specifically, as shown, the illustrated embodiment illustrates a plurality of power sources (i.e. power sources 1, 2, 3, . . . n) with a common power feedback and error, although it should be understood that control structures can be implemented as well. Thus, the power sources each contribute to the site power output.

Figure 7:
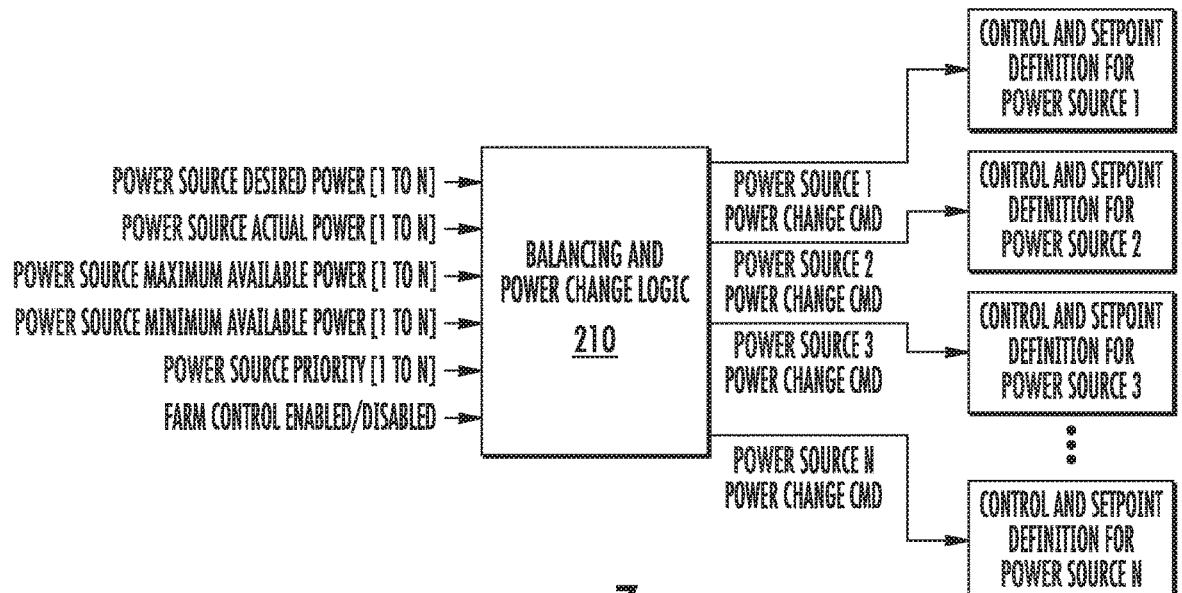
FIG. 7 illustrates a schematic diagram of one embodiment of a high-level power change request generation and signal flow for automatically controlling a renewable energy facility having a plurality of power sources according to the present disclosure.

Referring now to FIG. 7, a schematic diagram of one embodiment of a balancing and power change logic controller 210 that provides an additional input to the individual controllers of the various power sources described in FIG. 6 is illustrated. More specifically, in such embodiments, the logic controller 210 is configured to shape the command to and response of the individual asset(s). For example, the logic controller 210 may generate the power output for the facility by determining a plurality of individual power set points for the various power sources (i.e. control and set point definitions for power source 1, 2, 3, . . . n) based on the second farm-level power set point, a power feedback signal from the plurality of power sources (FIG. 6) and/or a plurality of additional inputs relating to each of the plurality of power sources. In such embodiments, as shown, the additional inputs may include a desired power, an actual power, a maximum available power, a minimum available power, a priority of each of the plurality of power sources, and/or whether farm control is enabled or disabled. The multiple power sources can then be operated based on the various power set points.

Figure 8:
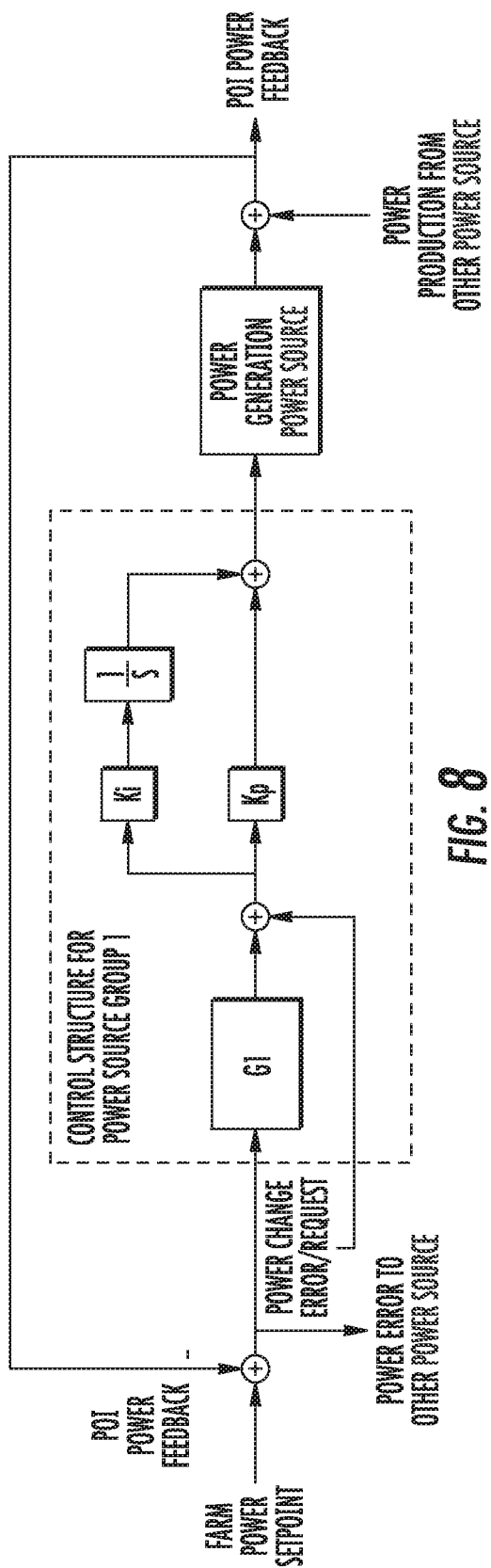
FIG. 8 illustrates a schematic diagram of one embodiment of a power change request structure integrated into a turbine controller according to the present disclosure.
Figure 9:
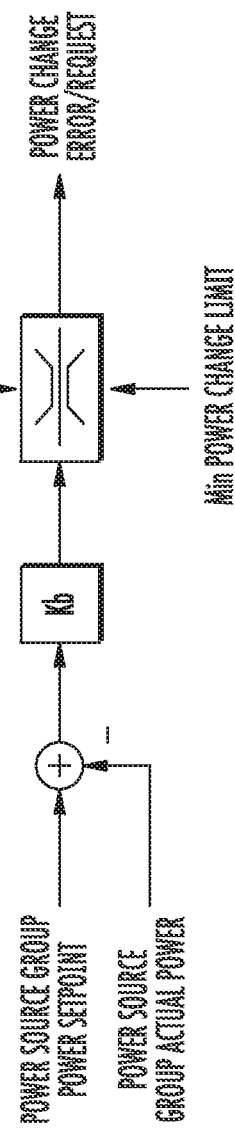
FIG. 9 illustrates a schematic diagram of one embodiment of a power change request generation structure according to the present disclosure.

More particularly, as shown in FIG. 8, the power change commands can then be incorporated into the individual controllers, one of which is shown. For example, as shown, for each asset a power change error/request is generated. This reflects the desired change of power produced by that asset or group of assets. An example schematic diagram for generating the power change error/request is described in FIG. 9. More specifically, as shown, each power source has a desired set point (provided by an external or internal service), which can differ from the farm-level set point and reflects the ideal operating point of the specific asset. The delta between the current power production of the asset or group of assets and the ideal set point is identified. Further, as shown, the delta is optionally multiplied by a gain and limited between the maximum and minimum limits to determine the desired power change direction (e.g. whether the power change should be positive or negative). The result is the power change error/request associated with an asset or asset group.

In such embodiments, the result of the delta (or the power change request) is configured to minimize the impact on the combined farm-level power output. In addition, the power change request is configured to increase the power output of one power source type and decrease the power output of the other power source type by the same magnitude. Since each power source type has a different response characteristic, realistically each power source will follow the change request slightly differently. This discrepancy will have an slight impact on farm-level power output. The limits imposed on the change request are an attempt at minimizing that impact.

In addition, the limits imposed can be dynamically defined by the capabilities of the power sources participating in the power change request handling. In certain embodiments, since the logic must match the increase of power of one power source with the decrease in power of another power source, the resulting commands to each power source must be dependent on the capabilities of both power sources moving in their designated directions. Without the limits, the power source(s) may be required to perform an action it is incapable of performing.

Referring back to FIG. 8, each asset controller receives the farm power set point and the power change error/request and generates a certain power output via its respective power generation power source. The power output from the power source and the power production from other assets are then summed together to determine a POI power feedback signal.

Figure 10:
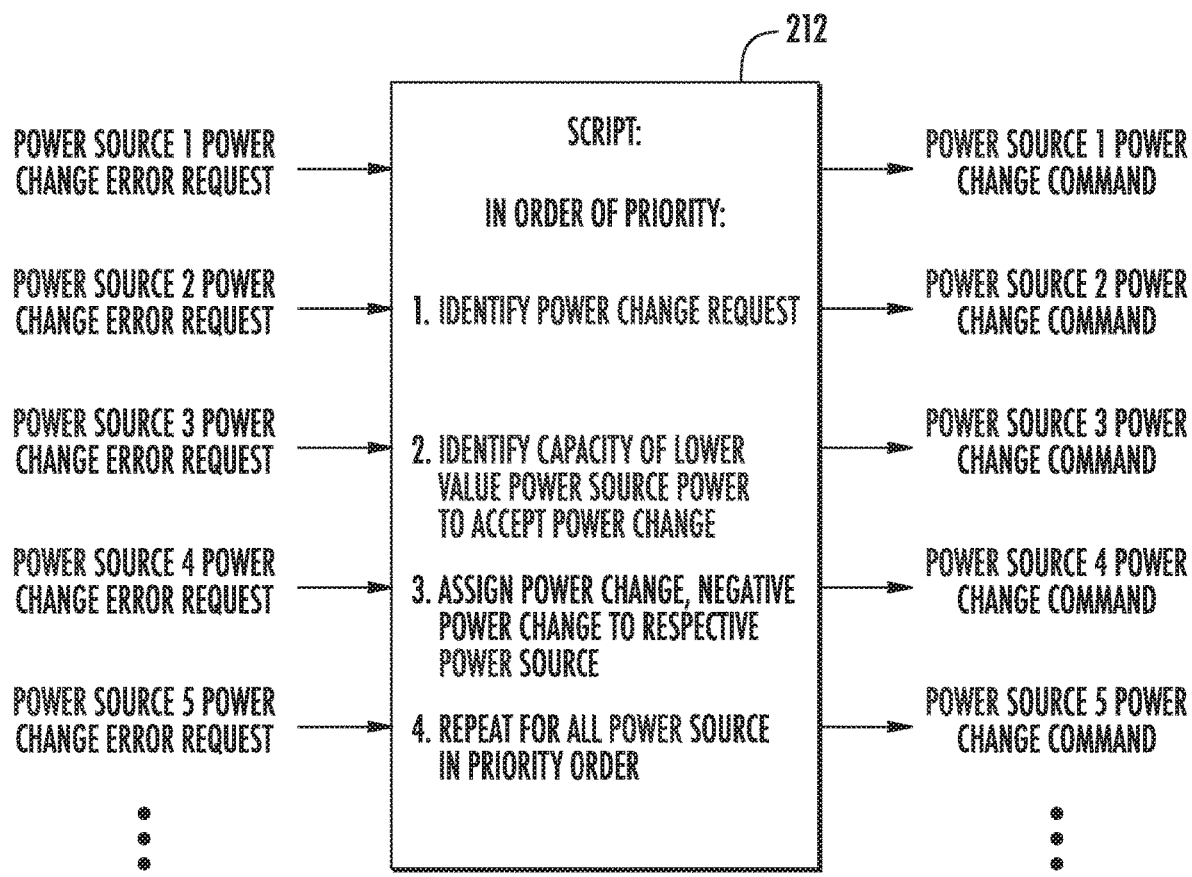
FIG. 10 illustrates a schematic diagram of one embodiment of power source power change command generation according to the present disclosure.

Referring now to FIG. 10, the power change requests may also be reconciled to accommodate potential conflicts based on the priority of each power source or groups of power sources. For example, as shown, logic 212 may receive the various power change requests and identify the power change requests, identify the capacity of lower priority power sources to accept power changes. The logic 212 can then assign the power requests and it's reciprocal to respective power sources. In addition, the logic is configured to repeat this process for all power sources in priority order (e.g. highest to lowest). This process yields a set of power changes commands to the power sources or groups of power sources, with the highest priority assets allocating power change requests first. Conflicting power change requests are yield power change commands that conform to the highest priority assets.

Accordingly, the present disclosure allows the hybrid renewably energy facility 100 to stack services. More specifically, rather than following only a farm-level set point, the present disclosure allows the farm-level controller to maintain the power output of the facility while allowing the commands to individual assets to be manipulated for secondary purposes. This yields a number of benefits, including but not limited to optimization of the power production in terms of operating costs, efficiencies, AEP, degradation, or similar metrics without interfering with the total farm performance.

Figure 11:
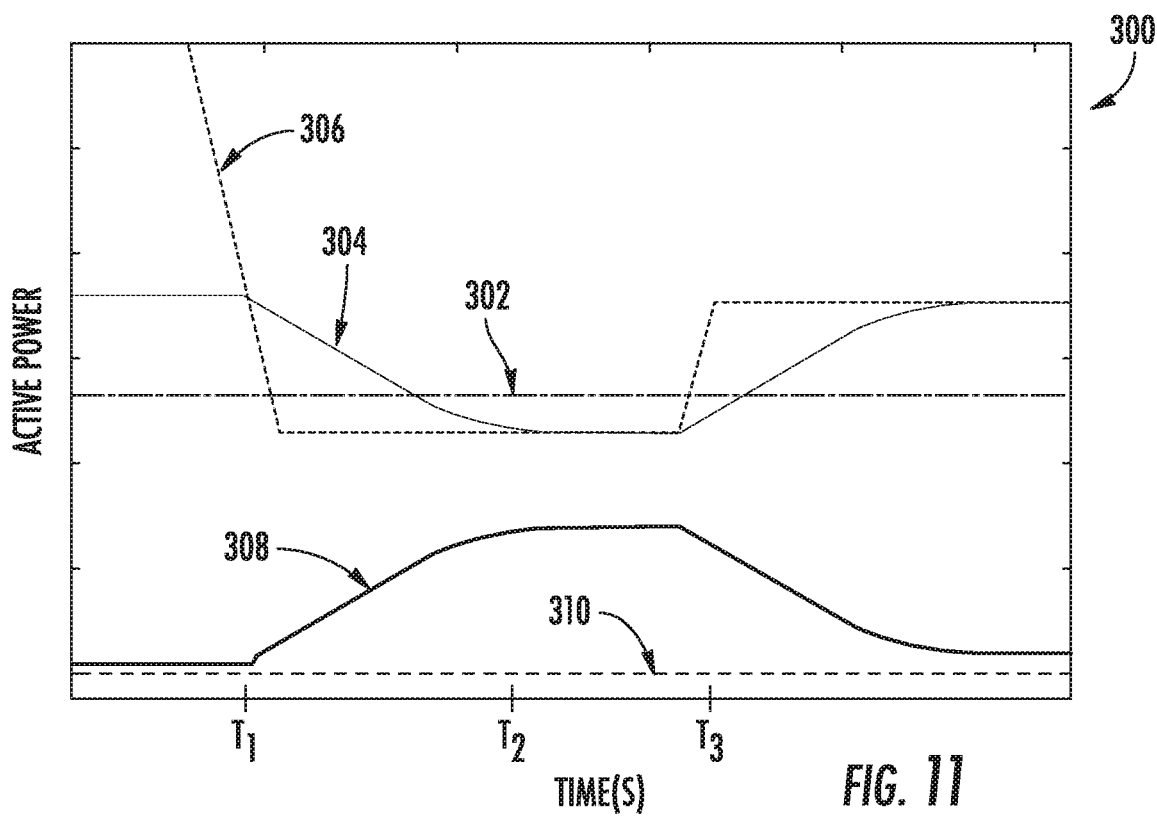
FIG. 11 illustrates a graph of one embodiment of active power (y-axis) versus time (x-axis) according to the present disclosure, particularly illustrating the farm-level power set point being constant.
Figure 12:
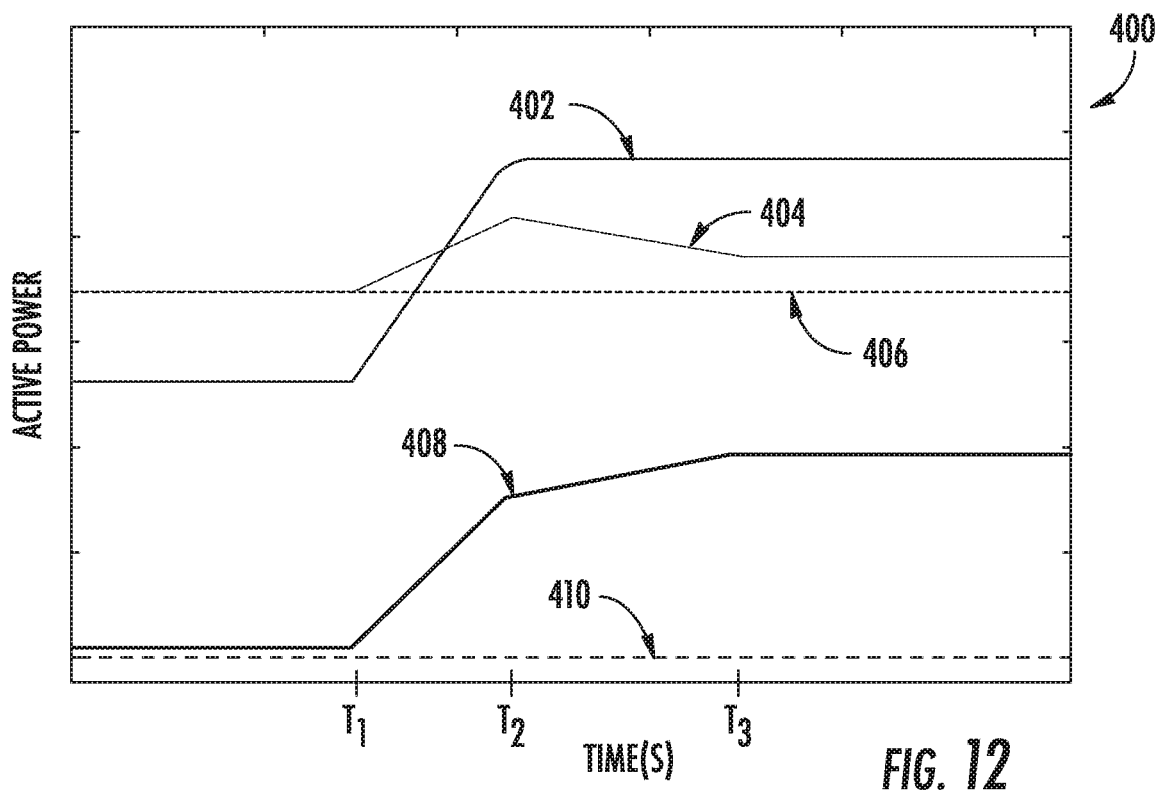
FIG. 12 illustrates a graph of another embodiment of active power (y-axis) versus time (x-axis) according to the present disclosure, particularly illustrating a change in the farm-level power set point.

Referring now to FIGS. 11 and 12, graphs 300, 400 of the active power (y-axis) versus time (x-axis) according to the present disclosure are illustrated. FIG. 11 illustrates an example control logic where the farm-level power set point 302 remains constant, whereas FIG. 12 illustrates an example control logic where the farm-level set point 402 changes. As shown particularly in FIG. 11, the farm-level power set point 302 is constant throughout the entire profile. At time $T_1$, the economically optimal splits of power change, thereby resulting in a different power set point 306 for the solar power source. The actual solar power is represented by curve 304. The priority of the solar power 304 is set to be higher than that of energy storage power 308, where the energy storage power set point is represented by line 310. Therefore, in such instances, when the controller determines which power set point to follow, solar power trumps energy storage power. In addition, as shown, the power change request control logic decides to shift power from solar power to energy storage power in order to follow the solar power set point. Moreover, as shown, the power change requests are issued and transfer of power occurs from time $T_1$ to around time $T_2$. At time $T_3$, the group power set points change again, yielding the same process in reverse. Therefore, as shown, the power is shifted to solar power instead of energy storage power.

Referring particularly to FIG. 12, a change in the farm-level power set point 402 occurs at time $T_1$ (i.e. the farm-level set point increases). Like the embodiment of FIG. 11, solar power 404 has a higher priority than energy storage power 408. The solar power set point and the energy storage power set point are represented by dashed lines 406 and 410, respectively. In addition, as shown, all power source types react in priority order to achieve the desired farm-level power set point 402. This typically means that the faster power sources will take up the bulk of the response. After the increased farm-level power set point 402 is achieved, (e.g. at time $T_2$), the power change control logic decides that solar power 404 has deviated from its desired group-level power set point 406 and decides to shift power from solar power 404 to energy storage power 408 in order to maintain the desired solar power set point 406. Thus, as shown, the power shifts from solar power 404 to energy storage power 408 from about $T_2$ to about $T_3$ (as shown by the decrease in solar power 404 and the increase in energy storage power 408). At time $T_3$, energy storage power 408 reaches a power limit and cannot push more power out. This limit maintains the solar power 404 from achieving the power set point because achieving the farm-level power set point 402 has a higher priority than allowing an individual group to reach its own individual power set point.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling a renewable energy facility having a plurality of power sources, the method comprising:
    operating, via a farm-level controller, the hybrid renewable energy facility at a first farm-level power set point;
    modifying, via the farm-level controller, the first power set point to a second farm-level power set point;
    in response to modifying the first power set point to the second farm-level power set point, generating one or more power change requests for individual controllers of the plurality of power sources;
    generating a power output via the plurality of power sources so as to transfer power generation from one of the plurality of power sources to another to reach and maintain the second farm-level power set point, wherein generating a power output via the plurality of power sources further comprises:
        generating a power output via a first power source of the plurality of power sources, the first power source having a first response rate; and,
        after the power output reaches the second farm-level power set point, generating at least a portion of the power output via a second power source of the plurality of power sources, the second power source having a second response rate that is less than the first response rate.

2. The method of claim 1, wherein, as the second power source begins to generate at least the portion of the power output, the first power source reduces an equivalent amount of power generated thereby.

3. The method of claim 2, further comprising reducing the amount of power generated by the first power source to zero during a transition period after the power output reaches the second farm-level power set point.

4. The method of claim 1, further comprising controlling the hybrid renewable energy facility via a closed loop architecture.

5. The method of claim 1, wherein generating the power output via the first power source and then generating at least portion of the power output via the second power source after the power output reaches the second power set point further comprises:
    determining, via the farm-level controller, first and second power set points for the first and second power sources of the plurality of power sources based on the second farm-level power set point and a power feedback signal from the plurality of power sources; and,
    operating the first and second power sources based on the first and second power set points.

6. The method of claim 5, further comprising determining the first and second power set points for the first and second power sources based on the second farm-level power set point, the power feedback signal from the plurality of power sources, and a plurality of additional inputs relating to each of the plurality of power sources.

7. The method of claim 6, wherein the plurality of additional inputs relating to each of the plurality of power sources comprise at least one of a desired power, an actual power, a maximum available power, a minimum available power, a priority of each of the plurality of power sources, and/or whether farm control is enabled or disabled.

8. The method of claim 1, further comprising prioritizing the power change requests to accommodate potential conflicts by determining which power source will operate when there are conflicting power set points.

9. The method of claim 1, further comprising determining, via the farm-level controller, the power change requests for the plurality of power sources by:
    receiving, from the individual controllers, individual power set points for the plurality of power sources;
    determining a delta between each the individual power set points and an actual power of each the plurality power sources, respectively; and,
    determining the power change requests for the plurality of power sources as a function of the delta.

10. The method of claim 9, wherein determining the power change requests for the plurality power sources as a function of the delta further comprises determining whether the delta is positive or negative by applying a gain and/or a limiter to the delta.

11. The method of claim 8, wherein prioritizing the power change requests to accommodate potential conflicts further comprises:
    identifying, via the farm-level controller, a capacity of one or more of the plurality of power sources to accept the power change requests; and,
    assigning each of the power change requests to an power source from the plurality of power sources in priority order.

12. The method of claim 1, wherein the first and second power sources comprise at least two of the following: a solar panel, an energy storage device, or a wind turbine, the renewable energy facility comprising at least one of a wind farm, a solar farm, or an energy storage system.

* * * * *